United States Patent Office 3,384,489
Patented May 21, 1968

3,384,489
SENSITIZED SILVER HALIDE EMULSIONS CONTAINING N,α-ALKYLENE BRIDGED SENSITIZING DYES
Lewis L. Lincoln and Donald W. Heseltine, Rochester, N.Y., assignors to Eastman Kodak Company, Rochester, N.Y., a corporation of New Jersey
No Drawing. Continuation of application Ser. No. 226,757, Sept. 27, 1962, now Patent No. 3,282,932, dated Nov. 1, 1966. This application Feb. 17, 1966, Ser. No. 528,107
13 Claims. (Cl. 96—105)

ABSTRACT OF THE DISCLOSURE

Merocyanine and styryl dyes derived from a N,α-alkylene oxazolium salt, a N,α-alkylene thioxazolium salt or a N,α-alkylene selenazolium salt are advantageously used to spectrally sensitize hydrophilic colloid silver halide emulsions and photographic elements containing at least one hydrophilic colloid silver halide emulsion layer.

This application is a continuing application of Lincoln and Heseltine U.S. Ser. No. 226,757 filed Sept. 27, 1962, now U.S. Patent 3,282,932.

This invention relates to photography and more particularly to sensitizing dyes synthesized from N,α-alkylene cyclammonium quaternary salts and to photographic silver halide emulsions and elements containing said dyes.

It is known that certain merocyanine, styryl and hemicyanine dyes are useful as photographic silver halide sensitizers.

It is therefore an object of our invention to provide new classes of merocyanine, styryl and hemicyanine dyes that are characterized by having an N,α-alkylene bridge and which are valuable photographic silver halide sensitizers.

Another object is to provide photographic silver halide emulsions that are sensitized by our new N,α-alkylene bridged sensitizing dyes.

Another object is to provide a synthesis for N,α-alkylene cyclammonium quaternary salts that are valuable intermediates used to prepare our new dyes.

Still other objects will become evident from the following specification and claims.

These and other objects are accomplished by the synthesis of N,α-alkenylene cyclammonium quaternary salts according to our novel reactions and their use to prepare our new N,α-alkylene bridged sensitizing dyes by subsequent condensation reactions according to our invention.

Included among the dyes of our invention are the merocyanine type dyes represented by the formula:

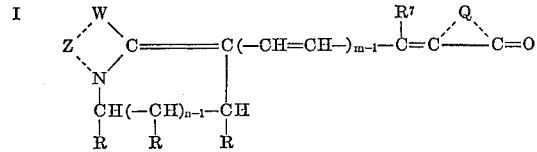

wherein W represents an oxygen atom, a sulfur atom or a selenium atom; Z represents the nonmetallic atoms necessary to complete a heterocyclic nucleus containing from 5 to 6 atoms in the heterocyclic ring, such as a nucleus of the thiazole series (e.g. thiazole, 4-methylthiazole, 4-phenylthiazole, 5-methylthiazole, 5-phenylthiazole, 4,5-dimetylthiazole, 4,5-diphenylthiazole, 4-(2-thienyl)thiazole, etc.); those of the benzothiazole series (e.g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e.g. alpha-naphthothiazole, beta-naphthothiazole, 5-methoxy-beta-naphthothiazole, 5-ethoxy-beta-naphthothiazole, 8-methoxy-alpha-naphthothiazole, 7-methoxy-alpha-naphthothiazole, etc.), those of the thionaphtheno-7′, 6′, 4, 5-thiazole series (e.g. 4-methoxythionaphtheno-7′, 6′, 4,5-thiazole, etc), those of the oxazole series (e.g. 4-methyloxazole, 5-methyloxazole, 4-phenyloxazole, 4,5-diphenyloxazole, 4-ethyloxazole, 4,5-dimethyloxazole, 5-phenyloxazole, etc), those of the benzoxazole series (e.g. benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the naphthoxazole series (e.g. alpha-naphthoxazole, beta-naphthoxazole, etc.), those of the selenazole series (e.g. 4-methylselenazole, 4-phenylselenazole, etc.), those of the benzoselenazole series (e.g. benzoselenazole, 5 chlorobenzoselenazole, 5-methoxybenzoselenazole, 5-hydroxybenzoselenazole, tetrahydrobenzoselenazole, etc.), those of the naphthoselenazole series (e.g. alpha-naphthoselenazole, beta-naphthoselenazole, etc.); $n$ is the integer from 1 to 2; $m$ is the integer from 1 to 2; R represents the hydrogen atom, an alkyl group, such as methyl, ethyl, propyl, butyl, etc., or an aryl group, such as phenyl, 4-methylphenyl, etc., such that each of the R groups is the same or different from the other R groups, $R^7$ represents the hydrogen atom, an alkyl group, such as methyl, ethyl, etc., or an aryl group such as phenyl, etc.; Q represents the non-metallic atoms necessary to complete a heterocyclic nucleus containing from 5 to 6 atoms in the heterocyclic ring, such as those selected from the group consisting of those of the thiazolone series, for example: those of the 2,4-thiazolidinedione series such as 2,4-thiazolidinedione, 3-alkyl-2,4-thiazolidinediones (e.g. 3-ethyl-2,4-thiazolidinedione, etc.), 3-phenyl-2,4-thiazolidinedione, 3-α-naphthyl-2,4-thiazolidinedione, etc., those of the 2-thio-2.4-thiazolidinedione (rhodanine) series, such as 3-alkyl-2-thio-2,4-thiazolidinedione (3-alkylrhodanines), (e.g. 3-ethyl-2-thio-2,4-thiazolidinedione (or 3-ethylrhodanine), 3-phenyl-2-thio-2,4-thiazolidinedione (3-phenylrhodanine), 3-α-naphthyl - 2 - thio-2,4-thiazolidinedione (3-α-naphthylrhodanine), 3 - (1-benzothiazyl)-2-thio-2,4-thiazolidinedione (3 - (1-benzothiazyl) rhodanine), etc., those of the 2-thio-2,5-thiazolidinedione series, such as 3-alkyl (e.g. 3-methyl, 3-ethyl, etc)-2-thio-2,5-thiazolidinediones, etc., those of the 2-alkylmercapto-4-(5)-thiazolone series, such as 2-ethylmercapto-4(5)-thiazolone, etc., those of the thiazolidone series, such as 4-thiazolidone or its 3-alkyl (e.g. ethyl, etc.), 3-phenyl or 3-α-naphthyl derivatives, those of the 2-alkylphenylamino-4(5)-thiazolone series (e.g. 2-ethylphenylamino-4(5)-thiazolone, etc.), those of the 2-diphenylamino-4(5)-thiazolone series; those of the 5(4)-thiazolone series, such as 2-ethylthio-5(4)-thiazolone, 2-benzylthio-5(4)-thiazolone, etc., those of the oxazolone series, for example: those of the 2-thio-2,4-oxazolidinedione series, such as 3-alkyl-2-thio-2,4-oxazolidinediones (e.g. 3-ethyl-2-thio-2,4-oxazolidinedione, etc.), those of the 2-imino-2,4(3,5)-oxazolone (pseudohyantoin) series, etc.; those of the 5(4)-oxazolone series, such as 2-phenyl-5(4)-oxazolone, 2-ethyl-5(4)-oxazolone, etc., those of the 5(4)-isoxazolone series, such as 3-phenyl-5(4)-isoxazolone, etc., those of the imidazolone series, for example: those of the hydantoin series, such as hydantoin, or its 3-alkyl- (e.g. ethyl, propyl, etc.), 3-phenyl or 3-α-naphthyl derivatives as well as its 1,3-dialkyl (e.g. 1,3-diethyl, etc), 1-alkyl-3-phenyl (e.g. 1-ethyl-3-phenyl, etc.), 1-alkyl-3-naphthyl (e.g. 1-ethyl-3-α-naphthyl, etc.), 1,3-diphenyl, etc. derivatives, those of the 2-thiohydantoin series, such as 2-thiohydantoin, or its 3-alkyl (e.g. 3-ethyl, etc.), 3-phenyl or 3-α-naphthyl derivatives as well as its 1,3-dialkyl (e.g. 1,3-diethyl, etc.), 1-alkyl-3-phenyl (e.g. 1-ethyl-3-phenyl, etc.), 1-alkyl-3-naphthyl (e.g. 1-ethyl-3-α-naphthyl),1,3-diphenyl, etc. derivatives, those of the 2-alkylmercapto-5(4) imidazolone series, such as 2-n-propylmercapto-5(4), imidazolone; those of the thionaphthenone series, such as 2(1)-thionaphthenone or 1(2)-thionaphthenone; those of the pyrazolone series, such as pyrazolone or its 1-alkyl (e.g. methyl, ethyl, etc.), 1-phenyl, 1-naphthyl (e.g. 1-α-naphthyl), 3-alkyl (e.g. methyl, ethyl, etc.), 3-phenyl, 3-naphthyl (3-α-naphthyl), 1-alkyl-3-phenyl (e.g. 1-methyl-3-phenyl, etc.), 3-alkyl-1-phenyl (e.g. 3-methyl-1-phenyl, etc.), 1,3-dialkyl (e.g. 1,3-dimethyl, etc.), 1,3-diphenyl, etc. derivatives; those of the oxindole series, such as 2,3-dihydro-3-ketoindole, and like five-membered heterocyclic nuclei; those of the 2,4,6-triketohexahydro pyrimidine series, for example, 2,4,6 - triketohexahydropyrimidine (barbituric acid), 2-thio-2,4,6-triketohexahydropyrimidine (2-thiobarbituric acid) as well as their 1-alkyl (e.g. 1-ethyl, etc.), or 1,3-dialkyl (1,3-diethyl, etc.) derivatives; the styryl dyes represented by the formula:

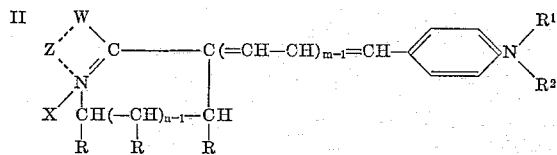

wherein W; Z; R; $n$; and $m$ are as defined previously; $R^1$ and $R^2$ each represent the hydrogen atom, an alkyl group (e.g. methyl, ethyl, propyl, butyl, etc.), an aryl group (e.g. phenyl, 4-methylphenyl, etc.); and X represents an acid anion such as $Cl^-$, $Br^-$, $I^-$, $C_2H_5SO_4^-$, $p\text{-}CH_3C_6H_4SO_3^-$, $SCN^-$ etc.; and the dyes represented by the formula:

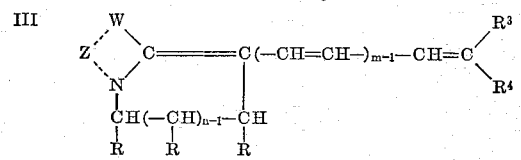

wherein W; Z; R; $n$ and $m$ are as defined previously; and $R^3$ and $R^4$ each represents a cyano group, a carbalkoxy group (e.g. carbethoxy) carbomethoxy, carbopropoxy, carbobutoxy, etc., a carboaryloxy (e.g. carbophenoxy, etc.), a carboxy group (e.g. carboxy, the alkali metal salt, such as sodium, potassium, etc. of the carboxy group, the organic ammonium salt, such as triethanol ammonium salt, etc. of the carboxy group, etc.), an acetamido group, etc.

The dyes of our invention are prepared from an N,α-alkylene cyclammonium quaternary salt, such as an N,α-alkylene quaternary oxazolium salt, an N,α-alkylene quaternary thiazolium salt, an N,α-alkylenethiazolinium salt, an N,α-alkylene quaternary selenazolium salt, and an N,α-alkylene quaternary selenazolinium salt represented by the formula:

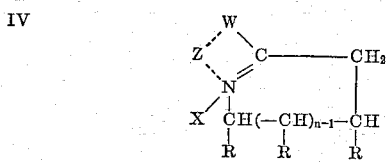

wherein Z, W, X, R and $n$ are as defined previously.

The cyclammonium quaternary salts of Formula IV are prepared according to our invention by one of the following synthesis:

Synthesis A

A compound of the formula

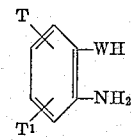

wherein W represents the sulfur atom, the selenium atom or the oxygen atom; and T and $T^1$ each represent the hydrogen atom, an alkyl group (e.g. methyl, ethyl, propyl, butyl, etc.), an aryl group (e.g. phenyl, etc.), a halogen atom (e.g. chlorine, bromine, iodine, etc.) or together T and $T^1$ contain the nonmetallic atoms necessary to complete a naphthalene compound, such as 1-amino-2-WH-naphthalene molecule, a 2-amino-3-WH-naphthalene molecule, or a 2-amino-1-WH-naphthalene molecule (or derivative of each of these naphthalene compounds) is condensed with a lactone having the formula:

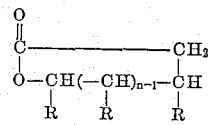

wherein R and $n$ are as defined previously. This condensation is effected in the presence of an acid anion furnishing compound, such as phosphoryl chloride, hydrobromic acid, hyroiodic acid, hydrochloric acid, etc.

Phosphoryl chloride, the preferred anion furnishing compound, forms the chloride salt of the quaternary compound. The chloride salt can easily be converted to other salts by treating the chloride salt with triethylamine or other halide acceptor, precipitating the methylene base of compound IV and then converting the base to the desired salt by treating with the appropriate acid, such as hydrobromic, hydroiodic, sulfuric, p-toluenesulfonic, thiocyanic, etc. The preferred method for converting the chloride salt of the quaternary oxazoles, the quarternary benzoxazoles and the quaternary naphthoxazoles of our invention is to treat them with a salt supplying the desired anion, such as sodium iodide, potassium iodide, sodium bromide, potassium bromide, etc., instead of forming the methylene base and treating it with the appropriate acid.

In an alternative synthesis the acid salt of the compound of Formula V, such as the aminehydrochloride, the aminehydroiodide, the aminehydrosulfate, etc. is condensed with the compound of Formula VI.

Synthesis B

A compound of Formula V defined previously is reacted with a compound having the formula:

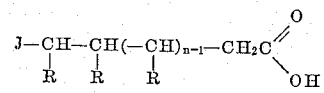

wherein R and $n$ are as defined previously and J represents a halogen atom, such as chlorine, bromine, and iodine. This reaction is advantageously effected by heating the reaction mixture to temperatures from room temperature to about 250–260° C. The corresponding halogen salt of the quaternary compound of Formula IV is formed. This may be converted to any of the other salts by the method described in Synthesis A.

Synthesis C

A cyclic thioamide of formula:

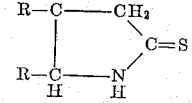

wherein R is as defined previously, is condensed with an α-haloketone represented by the formula:

IX

wherein $R^5$ represents an alkyl group, such as methyl, ethyl, propyl, butyl, etc., an aryl group, such as phenyl, etc. The condensation is effected advantageously by dissolving the reactants in a suitable inert solvent, such as benzene and heating to temperatures above room temperature, such as by heating over a steam bath. With this synthesis N,α-alkylene thiazolium salts of Formula IV are prepared.

The dyes of our invention are prepared from the N,α-alkylene cyclammonium quaternary salts of Formula IV by condensing these salts with an intermediate, such as an acetanilidomethylene compound, an acetanilidobutadienyl compound, an acetanilidohexatrienyl compound where these three compounds may be derivatives of malonic acid or derivatives of keto compounds, and an aldehyde, such as a derivative of benzaldehyde, a derivative of cinnamaldehyde, etc. Alternatively, the merocyanine dyes of our invention are prepared by converting the quarternary salt of Formula IV to its acetanilidomethylene derivative, its acetanilidobutadienyl derivative or its acetanilidohexatrienyl derivative and then condensing one of these derivatives which a ketomethylene compound.

The merocyanine dyes are produced to advantage by condensing a quaternary salt of Formula IV with an intermediate having the formula:

X
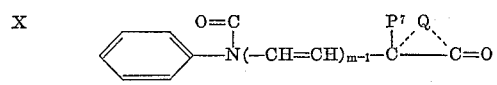

wherein Q, $R^7$ and $m$ are as defined previously. The condensations can advantageously be carried out in the presence of a basic condensing agent, e.g. the organic tertiary amines, such as triethylamine, tri-n-propylamine, triisopropylamine, tri-n-butylamine, etc., N-methylpiperidine, N - ethylpiperidine, N,N - dimethylaniline, N,N-diethylaniline, etc. The condensations can advantageously be effected in the presence of an inert solvent, e.g. ethanol, n-propanol, isopropanol, 1,4 - dioxane, pyridine, quinoline, etc. Heating accelerates the condensations and temperatures varying from room temperature to the reflux temperature of the solvent in the reaction mixture are used.

The merocyanine dyes of our invention are also produced advantageously by reacting the cyclammonium quarternary salt of Formula IV with N,N' - diphenylformamidine, β - anilinoacrolein anil hydrochloride, or glutaconaldehyde dianilide hydrochloride and then refluxing with acetic anhydride to make the 3 - acetanilidomethylene, the 3-acetanilodobutadienyl, or the acetanilidohexatrienyl derivative respectively of the salt of Formula IV which is then condensed with the ketomethylene intermediate having the formula:

XI

wherein Q is as defined previously. This condensation reaction is advantageously carried out in the presence of any of the basic condensing agents listed previously, in an inert solvent and at temperatures between room temperature and the reflux temperature of the solvent in the reaction mixture.

The styryl dyes of our invention are advantageously prepared by condensing the quaternary salt of Formula IV with an intermediate used to produce a styryl dye, said intermediate being an aldehyde having the formula:

XII
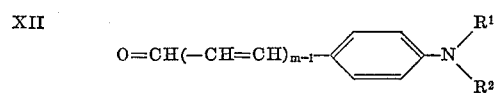

wherein $R^1$, $R^2$ and $m$ are as described previously. This condensation is advantageously effected in the presence of a basic condensing agent, such as a piperidine, as described previously, and in the presence of an inert solvent, such as have been described for the merocyanine synthesis. Heat accelerates the reaction which is conveniently carried out between room temperature and the reflux temperature of the solvent.

Other dyes of our invention are prepared by condensing a quaternary salt of Formula IV with an intermediate containing a reactive acetanilido group that is used to prepare hemicyanine dyes, said intermediate having the formula:

XIII
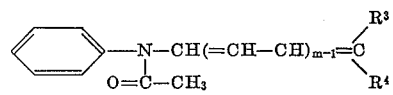

wherein $R^3$, $R^4$ and $m$ are as defined previously. This reaction is advantageously effected in the presence of a basic condensing agent, and an inert solvent. The reaction is accelerated by heat and it is advantageous to conduct the reaction between room temperature and the reflux temperature.

The cyclammonium quaternary salts of Formula IV are also valuable for preparing cyanine dyes represented by the formulas:

XIV
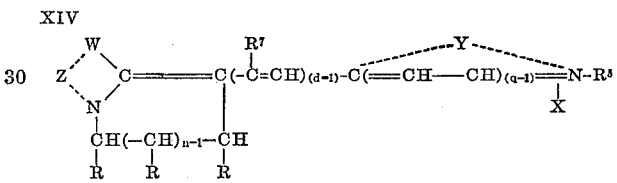

and

XV
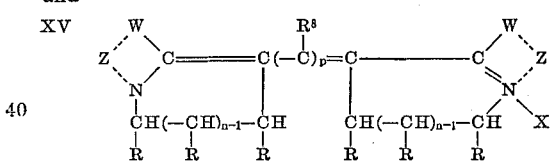

wherein W, Z, R, $R^7$, X and $n$ are as defined previously, $d$ represents an integer from 1 to 2, $q$ represents an integer from 1 to 2, $p$ represents an integer from 1 to 3, $R^5$ represents an alkyl group, such as methyl, ethyl, n-propyl, isopropyl, n-butyl, isobutyl, sulfoalkyl (e.g. 3-sulfobutyl, 4-sulfobutyl, etc.), carboxymethyl, β-carboxyethyl, carbomethoxymethyl, carbethoxymethyl, β-hydroxyethyl, phenylmethyl, etc., and Y represents the non-metallic atoms necessary to complete a heterocyclic nucleus containing from 5 to 6 atoms in the heterocyclic ring, such as those selected from the thiazole series, those of the benzothiazole series, those of the naphthothiazole series, those of the thionaphtheno-7', 6', 4,5-thiazole series, those of the oxazole series, those of the benzoxazole series, those of the naphthoxazole series, those of the selenazole series, those of the benzoselenazole series, those of the naphthoselenazole series where each of these series is as defined previously for Z and in addition represents the heterocyclic rings of the 2-quinoline series (e.g. quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, etc.), those of the 4-quinoline series (e.g. quinoline, 6-methoxyquinoline, 7-methylquinoline, 8-methylquinoline, etc.), those of the 1-isoquinoline series (e.g. isoquinoline, 3,4-dihydroisoquinoline, etc.), those of the 3-isoquinoline series (e.g. isoquinoline, etc.), those of the pyridine series (e.g. pyridine, 5-methylpyridine, etc.), etc.; and $R^8$ represents the hydrogen atom, an alkyl group, such as methyl, ethyl, etc., or an aryl group such as phenyl, such that when $p$ represents the integer 2 or 3, $R^8$ represents the hydrogen atom.

The cyanine dyes of Formula XIV are prepared by reacting a cyclammonium quaternary salt of Formula IV with an intermediate having the formula:

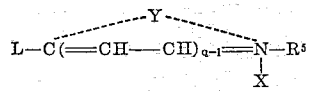

wherein Y, $R^5$, X and $q$ are as defined previously and L represent a halogen atom, such as iodine, an alkyl- or arylmercapto group (e.g. methylmercapto, ethylmercapto, phenylmercapto, etc.) or represents the group:

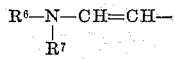

wherein $R^6$ represents a carboxylic aryl group, such as acetyl, propionyl, butyryl, benzoyl, etc. (e.g. a carboxylic aryl group containing from 2 to 7 carbon atoms), and $R^7$ represents an aromatic group such as phenyl, o-, m-, and p-tolyl, etc.

The cyanine dyes of Formula XV are prepared by reacting a quaternary salt of Formula IV with an ortho ester, such as diethoxymethylacetate, ethylorthoformate, triethylorthoacetate, ethylorthopropionate, 1,3,3-trimethoxypropene, etc.

These reactions used to prepare the cyanine dyes are advantageously accelerated by treating the reaction mixture, generally temperatures varying from room temperature to the reflux temperature of the reaction mixture being satisfactory. The reactions can be carried out in the presence of an inert diluent, such as pyridine, nitrobenzene, ethanol, n-propanol, etc.

Included among the merocyanine dyes of Formula I are the following typical dyes.

Dye 1.—5-[4-(1H-2,3-dihydropyrido[2,1-b]benzothiazolyl)methylene]-3-ethylrhodanine 2,3-tetramethylenebenzothiazolium chloride (1 mol., 2.26 g.), 5-acetanilidomethylene-3-ethylrhodanine (1 mol., 3.06 g.) and triethylamine (2 mols., 2.8 ml.) were dissolved in ethyl alcohol (100 ml.) and heated under reflux for twenty minutes. The reaction mixture was then chilled, crystalline dye filtered off, washed with acetone and dried. After two recrystallizations from pyridine the yield of pure dye was 1.5 g. (42%) M.P. 304°–305° C. dec.

Dye 2.—5[3-(1,2-dihydropyrrolo[2,1-b]benzothiazolyl)methylene]-3-ethyl-2-thio-2,4-oxazololidinedione 3 - acetanilidomethylene - 2,3 - dihydro - 1H - pyrrolo [2,1-b]benzothiazolium bromide (1 mol., 1.93 g.), 3-ethyl-2-thio-2,4-oxazolidinedione (1 mol., 0.72 g.) and triethylamine (2 mols., 1.4 ml.) were dissolved in ethyl alcohol (150 ml.) and heated under reflux for ten minutes. The reaction mixture was then chilled, crystalline dye filtered off, washed with methyl alcohol and dried. After two recrystallizations from toluene the yield of pure dye was 0.6 g. (36%) M.P. 278°–279° C. dec.

Dye 3.—4-[3-(1,2-dihydropyrrolo[2,1-b]benzothiazolyl)methylene]-3-methyl-1-phenyl-2-pyrazolin-5-one 3-acetanilidomethylene-2,3-dihydro-1H-pyrrolo [2,1-b] benzothiazolium bromide (1 mol., 1.93 g.), 3-methyl-1-phenyl-5-pyrazolone (1 mol., .87 g.) and triethylamine (2 mols., 1.4 ml.) were dissolved in ethyl alcohol (150 ml.) and heated under reflux for ten minutes. The reaction mixture was then chilled, crystalline dye filtered off, washed with methyl alcohol and dried. After two recrystallizations from toluene the yield of pure dye was 0.6 g. (33%) M.P. 255°–256° C. dec.

Dye 4.—5-[3-(1,2-dihydropyrrolo[2,1-b]benzothiazolyl)methylene]-1-ethyl-2-thiobarbituric acid 3 - acetanilidomethylene - 2,3 - dihydro -1H - pyrrolo [2,1-b]benzothiazolium bromide (1 mol., 1.93 g.), 3-ethyl-2-thiobarbituric acid (1 mol., 0.86 g.) and triethylamine (2 mols., 1.4 ml.) were dissolved in ethyl alcohol (150 ml.) and heated under reflux for ten minutes. The reaction mixture was then chilled, crystalline dye filtered off, washed with methyl alcohol and dried. After two recrystallizations from pyridine and methyl alcohol the yield of pure dye was 1 g. (56%) M.P. 307°–308° C. dec.

Dye 5.—5-[8-(5H-2,3,6,7-tetrahydrothiazolo[3,2-a]pyridyl)methylene]-3-ethylrhodanine 2,3-tetramethylenethiazolinium iodide (1 mol., 1.78 g.) and 5-acetanilidomethylene-3-ethylrhodanine (1 mol., 1.78 g.) were mixed in dry pyridine (15 ml.), triethylamine (2 mols., 1.4 ml.) added and the mixture heated under reflux for fifteen minutes. The mixture was then chilled, crystalline dye filtered off, washed with methyl alcohol and dried. After two recrystallizations from pyridine and methyl alcohol the yield of pure dye was 0.45 g. (25%) M.P. 254–255° C. dec.

Dye 6.—3-ethyl-5-[4-(3-methyl-1H-2,3-dihydropyrido [2,1-b] benzothiazolyl)methylene]rhodanine 3-methyl-1,2,3,4-tetrahydropyrido[2,1-b]benzothiazolium iodide (1 mol., 1.65 g.), 5-acetanilidomethyl-3-ethylrhodanine (1 mol., 1.78 g.) and triethylamine (2 mols., 1.4 ml.) were dissolved in dry pyridine (15 ml.) and heated under reflux ten minutes. The reaction mixture was then chilled and the dye precipitated from solution by an excess of water with stirring, solid dye filtered off, washed with methyl alcohol and dried. After two recrystallizations from pyridine and methyl alcohol the yield of pure dye was 1 g. (53%), M.P. 276°–277° C. dec.

Dye 7.—3-ethyl-5-[(8-phenyl-2,3-dihydro-1H-pyrido [2,1-b]benzoxazol-4-yl)methyl]rhodanine 4 - acetanilidomethylene - 5 - phenyl - 1,2,3,4 - tetrahydropyrido[2,1-b]benzoxazolium bromide (1 mol., 0.95 g.) and 3-ethylrhodanine (1 mol. plus 100% excess, 0.64 g.) were mixed in ethyl alcohol (10 ml.), the mixture heated to reflux and triethylamine (2 mols., 0.56 ml.) added and the mixture heated under reflux for ten minutes. The reaction mixture was then chilled, solid dye filtered off, washed with methyl alcohol and dried. After two recrystallizations from pyridine the yield of pure dye was 0.5 g. (63%), M.P. 314–315° C. dec.

Included among the styryl dyes of Formula II are the following typical dyes, 8 through 12.

Dye 8.—4-p-dimethylaminobenzylidene-1,2,3,4-tetrahydropyrido[2,1-b]benzothiazolium chloride 2,3-tetramethylenebenzothiazolium chloride (1 mol., 2.26 g.), p-dimethylaminobenzaldehyde (1 mol. plus 100% excess, 3 g.) and piperidine, 2 drops, were dissolved in ethyl alcohol (100 ml.) and heated under reflux for fifteen minutes. The reaction mixture was then chilled, crystalline dye filtered off, washed with acetone and dried. After two recrystallizations from acetic acid the yield of dye was 0.3 g. (8%) M.P. 249–250° C. dec.

Dye 9.—8-p-dimethylaminobenzylidene-2,3,5,6,7,8-hexahydrothiazolo[3,2-a]pyridinium iodide 2,3-tetramethylenethiazolinium iodide (1 mol., 1.34 g.) and p-dimethylaminobenzaldehyde (1 mol. plus 100% excess, 1.49 g.) were dissolved in ethyl alcohol (20 ml.), piperidine (two drops) added and the mixture heated under reflux for thirty minutes. The mixture was then chilled, solid dye filtered off, washed with acetone and dried. After two recrystallizations from methyl alcohol the yield of pure dye was 0.3 g. (15%) M.P. 235–236° C. dec.

Dye 10.—4-p-dimethylaminobenzylidene-1,2,3,4-tetrahydropyrido[2,1-b]naphth[2,3]oxazolium iodide 2,3 - tetramethylenenaphth[2,3]oxazolium iodide (1 mol., 1.57 g.) and p-dimethylaminobenzaldehyde (1 mol. plus 100% excess, 1.49 g.) were mixed in acetic anhydride (15 ml.) and heated under reflux for ten minutes. The reaction mixture was then chilled, and the crude dye precipitated from solution by adding an excess of ether and stirring. The crude dye was filtered off, washed with acetone and dried. After two recrystallizations from methyl alcohol the yield of pure dye was 0.2 g. (8%) M.P. 218–219° C. dec.

Dye 11.—4-p-dimethylaminobenzylidene-3-methyl-1,2,3,4-tetrahydropyrido[2,1-b]benzothiazolium iodide 3 - methyl - 1,2,3,4 - tetrahydropyrido[2,1-b]benzothiazolium iodide (1 mol., 1.65 g.), p-dimethylaminobenzaldehyde (1 mol. plus 100% excess, 1.49 g.) and piperidine (2 drops) were dissolved in ethyl alcohol (15 ml.) and heated under reflux for twenty minutes. The mixture was then chilled, crystalline dye filtered off, washed with acetone and dried. After two recrystallizations from methylal alcohol the yield of pure dye was 0.6 g. (26%), M.P. 265–266° C. dec.

Dye 12.—4-p-dimethylaminobenzylidene-8-phenyl-1,2,3,4-tetrahydropyrido[2,1-b]benzoxazolium iodide 5-phenyl-2,3-tetramethylenebenzoxazolium bromide (1 mol., 1.65 g.) and p-dimethylaminobenzaldehyde (1 mol. plus 100% excess, 1.5 g.) were mixed in absolute ethyl alcohol (10 ml.), piperidine (2 drops) added and the mixture heated under reflux for thirty minutes. The mixture was then chilled, and the crude dye precipitated as the iodide salt by adding sodium iodide with stirring. The dye was then filtered off, washed with acetone and dried. After two recrystallizations from methyl alcohol the yield of pure dye was 0.4 g. (16%), M.P. 292–293° C. dec.

Dye 13.—3-(2,2-dicyanovinyl)-1,2-dihydropyrrolo[2,1-b]benzothiazole

Acetic anhydride (2 mols., 2.02 g.) was added to anilinomethylenemalonitrile (1 mol., 1.69 g.) and the mixture heated until a melt had formed. The heating was discontinued, 2,3-trimethylenebenzothiazolium bromide (1 mol., 2.56 g.), ethyl alcohol (40 ml.) and triethylamine (2 mols., 2.8 ml.) added and the mixture heated under reflux for ten minutes. The reaction mixture was then chilled, crystalline dye filtered off, washed with methyl alcohol and dried. After two recrystallizations from pyridine and methyl alcohol the yield of pure dye was 0.5 g. (20%) M.P. above 310° C.

Dye 14.—3-(4,4-dicyano-1,3-butadienyl)1,2-dihydropyrrolo[2,1-b]benzothiazole 2,3-trimethylenebenzothiazolium bromide (1 mol., 1.23 g.), 4-acetanilido-1,3-butadienylmalononitrile (1 mol., 1.18 g.) and triethylamine (2 mols., 1.4 ml.) were dissolved in ethyl alcohol (130 ml.) and heated under reflux for ten minutes. The reaction mixture was then chilled, crystalline dye filtered off, washed with methyl alcohol and dried. After two recrystallizations from toluene the yield of pure dye was 1 g. (39%) M.P. 281°–282° C. dec.

Included among the hemicyanine dyes of our invention are the preceding typical examples illustrated by dyes 13 and 14.

Included among the cyanine dyes prepared according to our invention are the following illustrative examples.

Dye 15.—3,8,3′,12-di-trimethylenethiadicarbocyanine chloride 2,3-tetramethylenebenzothiazolium chloride (2 mols., 4.52 g.) and 1,3,3-trimethoxypropene (1 mol. plus 100% excess, 2.64 g.) were dissolved in dry pyridine (20 ml.) and heated under reflux for five minutes. The reaction mixture was then chilled, crude dye filtered off, washed with acetone and dried. After two recrystallizations from acetic acid the yield of dye was 3 g. (67%) M.P. 280°–281° C. dec.

Dye 16.—3-ethyl-3′,10-trimethyleneoxathiacarbocyanine iodide 2,3-tetramethylenebenzothiazolium chloride (1 mol., 2.26 g.), 2-β acetanilidovinyl-3-ethylbenzoxazolium iodide (1 mol., 4.34 g.) and triethylamine (2 mols., 2.8 ml.) were dissolved in ethyl alcohol (50 ml.) and heated under reflux for ten minutes. The reaction mixture was then chilled, crystalline dye filtered off, washed with acetone and dried. After two recrystallizations from methyl alcohol the yield of pure dye was 1.1 g. (22.5%) M.P. 281°–282° C. dec.

Dye 17.—3-ethyl-3′,10-ethylenethiacarbocyanine iodide 2,3-trimethylenebenzothiazolium bromide (1 mol., 1.94 g.), 2-β-acetanilidovinyl-3-ethylbenzothiazolium iodide (1 mol., 2.25 g.) and triethylamine (2 mols., 2.8 ml.) were dissolved in ethyl alcohol (20 ml.) and heated under reflux for ten minutes. The reaction mixture was then chilled, crystalline dye filtered off, washed with acetone and dried. After two recrystallizations from methyl alcohol the yield of pure dye was 1.4 g. (56%) M.P. 265°–266° C. dec.

Dye 18.—3-(2-benzothiazolylvinyl)1,2-dihydropyrrolo[2,1-b]benzothiazole 3-ethyl-3′,10-ethylenethiacarbocyanine iodide (1 mol., 4.7 g.) was suspended in dithylaniline (250 ml.) and the mixture heated to reflux temperature while being stirred mechanically. A slow stream of nitrogen gas was passed over the mixture. Slow distillation of the diethylaniline at atmospheric pressure was continued for a period of about thirty minutes until the color of the cyanine dye was completely replaced by the yellow color of the dye base. The solution was then allowed to cool somewhat and gravity filtered to free the solution from a small amount of unchanged dye. The filtrate was then concentrated under reduced pressure to a volume of about 20 ml. After cooling, the residue was turned into ether (200 ml.), low boiling ligroin (300 ml.) added with hand stirring and after several minutes of stirring the dye base crystallized out of solution as red crystals. At this point the mixture was chilled, crystalline dye base filtered off, washed with low boiling ligroin and dried. After two recrystallizations from methyl alcohol, the yield of pure dye base was 1.2 g. (25%) M.P. 178°–179° C. dec.

Dye 19.—Anhydro-3,8-ethylene-3′-(3-sulfobutyl) thiacarbocyanine hydroxide

A mixture of 3-(2-benzothiazolylvinyl)-1,2-dehydropyrrolo[2,1-b]benzothiazole (1 mol., 1 g.) and 2,4-butanesultone (1 mol. plus 50% excess, 0.6 g.) was placed in a flask and heated in an oil bath at 110° C. for three hours. The mixture was then cooled, the viscous mass of dye stirred with an excess of acetone, crystalline dye filtered off, washed with acetone and dried. After two recrystallizations from aqueous pyridine and acetone the yield of pure dye was 0.4 g. (30%) M.P. 297°–298° C. dec.

Dyes such as (A) anhydro-3-ethyl-9-methyl-3′-(3-sulfobutyl)thiacarbocyanine hydroxide, (B) anhydro-5,5′,6,6′ - tetrachloro - 1,1′ - 3 - triethyl - 3′ - (4 - sulfobutyl) benzimidazolocarbocyanine hydroxide, and (C) anhydro-3,9 - diethyl - 3′ - (4 - sulfobutyl)oxacarbocyanine hydroxide which are outside of our invention are prepared from the corresponding parent dyes having no sulfo alkyl substituents on them by forming the dye base and then reacting the dye base with the appropriate alkanesultone by the same type of synthesis as described in forming Dye 18 (the dye base of Dye 17) and converting Dye 18 to Dye 19. Thus, Dye A is formed from 3,3′-diethyl-9-methylthiacarbocyanine iodide (made by methods well known in the art), by converting it to 2-[3-(3-ethyl-2 (3H) - benzothiazolylidene) - 2 - methylpropenyl]benzothiazole and reacting this dye with an equimolar amount of 2,4-butanesultone. Dye B is formed from 5,5′,6,6′-tetrachloro - 1,1′ - 3,3′ - tetraethylbenzimidazolo carbocyanine iodide (made by methods well known in the art), by converting it to 5,6-dichloro-1-ethyl-2-[3-(5,6-dichloro - 1,3 - diethyl - 2 - (3H) - benzimidazolylidene) propenyl]benzimidazole and then reacting this dye base with an equimolar amount of 1,4-butanesultone. Dye C is formed from 3,3',9 - triethyl - 5,5' - diphenyloxacarbocyanine iodide (made by methods well known in the art), by converting it to the dye base 2-[2-ethyl-3-(3-ethyl - 5 - phenyl - 2 - (3H)benzoxazolylidene)propenyl]-5-phenylbenzoxazole and then reacting this dye base with an equimolar amount of 1,4-butanesultone.

The N,α-cyclammonium quaternary salts of formula IV and their synthesis by methods A, B and C are illustrated by the following typical examples, which were used to prepare illustrative dyes of our invention.

Synthesis A was used to prepare the following.

2,3-trimethylenebenzothiazolium chloride o-Aminothiophenol (1 mol., 12.5 g.) and γ-butyrolactone (1 mol., 8.6 g.) were mixed, phosphoryl chloride (10 ml.) added portionwise and much heat was evolved. After several minutes the evolution of heat subsided and the hot viscous mass was turned into an excess of acetone with stirring. The acetone was then decanted from the sticky mass, fresh acetone added with stirring and the acetone again decanted. After one more such acetone treatment the product obtained solid by adding ethyl alcohol (100 ml.) with stirring. The cream colored solid was then filtered off, washed with acetone and dried. After one recrystallization from ethyl alcohol the yield of product was 14 g. (67%) M.P. 158–159° C.

2,3-trimethylenebenzothiazolium bromide 2,3-trimethylenebenzothiazolium chloride (14 g.) was dissolved in methanol (75 ml.) and treated with triethyl amine (2 moles; 8.7 ml.). The methylene base separated from the solution as a pale yellow solid. The solid was collected on a filter funnel, washed with methanol, dissolved in acetone (40 ml.) and converted to the bromide quaternary salt by adding 30% hydrobromic acid in acetic acid (7.5 ml.) with stirring. The mixture was then chilled, crude salt filtered off, washed with acetone and dried.

2,3-tetramethylenebenzothiazolium chloride o-Aminothiophenol (1 mol., 12.5 g.) and γ-valerolactone (1 mol., 10 g.) were mixed, phosphoryl chloride (10 ml.) added portionwise and much heat was evolved. After several minutes the evolution of heat subsided and the hot viscous mass was turned into an excess of acetone with stirring. The acetone was then decanted from the sticky mass, fresh acetone added with stirring and the acetone again decanted. After one more such acetone treatment the product was dissolved in ethyl alcohol and precipitated from solution by adding an equal volume of acetone with stirring and chilling. The pink salt was then filtered off, washed with acetone and dried.

2,3-tetramethylenenaphth[2,3-d]oxazolium iodide 2-amino-3-naphthol (1 mol., 15.9 g.) and γ-valerolactone (1 mol., 10 g.) were mixed and heated at 180° C. for two minutes at which time a viscous melt had formed. At this point phosphoryl chloride (10 ml.) was added portionwise to the hot melt, mixture heated at 200° C. for fifteen minutes and the hot orange melt turned into a beaker, cooled and washed with ether. The viscous mass was then treated with acetone (1 l.) and the solid that was obtained was filtered off, washed with more acetone and discarded. The acetone filtrates were then combined, treated with sodium iodide (15 g.), mixture allowed to stand at room temperature seventy-two hours and the product that precipitated from solution as a pink solid was filtered off, washed with acetone and dried. After two recrystallizations from ethyl alcohol the yield of pure salt was 18 g. (57%) M.P. above 320° C.

2,3-tetramethylenethiazolium iodide 2-mercaptoethylamine HCl (1 mol., 34.2 g.), γ-valerolactone (1 mol., 30 g.) and phosphoryl chloride (15 ml.) were mixed and the mixture heated under reflux for ten minutes at which time the mixture consisted of a dark amber viscous mass. The viscous mass was then turned into a beaker, cooled, stirred with an excess of ether, ether decanted and the viscous residue dissolved in ethyl alcohol (250 ml.). At this point a saturated acetone solution of sodium iodide containing sodium iodide (2 mols., 75.6 g.) was added to the alcohol solution with stirring causing a white solid to precipitate out of solution. The white solid was then filtered off and discarded, and the alcohol-acetone filtrates concentrated to dryness. The remaining residue was then stirred with acetone (200 ml.) giving a cream colored solid which was filtered off, washed with a small amount of acetone and dried. After recrystallization from ethyl alcohol the yield of pure salt was 26 g. (32%) M.P. 147–150° C.

3-methyl-1,2,3,4-tetrahydropyrido[2,1-b]benzothiazolium iodide o-Aminothiophenol (1 mol., 12.5 g.) and β-methyl-γ-valerolactone (1 mol., 9.2 g.) were mixed, then phosphoryl chloride (1 mol., 9.2 ml.) was added portionwise and much heat was evolved. After all of the phosphoryl chloride was added and the evolution of heat subsided the hot viscous mass was turned cautiously into a beaker of acetone. The mass became solid immediately. At this point the acetone was decanted from the solid and the solid dissolved in hot water (400 ml.), gravity filtered and the product converted to the iodide salt by adding solid sodium iodide (10 gms.) to the solution with stirring. The iodide salt precipitated out of solution as a light tan solid which was filtered off, washed with water and dried. Yield of crude product 16 g. (48%), M.P. 280–282° C.

Synthesis B was used to prepare:

2,3-tetramethylenenaphth[2,3-d]oxazolium bromide 2-amino-3-naphthol (1 mol., 15.9 g.) and 5-bromovaleric acid (1 mol. plus 30% excess, 25.9 g.) were mixed and heated by means of a heating mantle (mantle temperature 200° C.) for ten minutes, then the mantle temperature was raised to 250° C. for five minutes. At this point the mantle temperature was lowered to 200° C. and the heating at this temperature continued for fifteen minutes. The mixture was then cooled and stirred with acetone (400 ml.) at which time the viscous mass became solid. The solid was then filtered off, washed with a small amount of acetone and dried. After recrystallization from ethyl alcohol the yield of salt was 19 g. (62%) M.P. 291–292° C. dec.

5-phenyl-2,3-tetramethylenebenzoxazolium bromide 2-amino-4-phenylphenol (1 mol., 9.25 g.) and 5-bromovaleric acid (1 mol., 9.05 g.) were mixed in dimethylacetamide (18 ml.) and the mixture heated under reflux for two hours. The amber solution was then chilled, stirred with an excess of ether, ether decanted and the white sticky residue dissolved in ethyl alcohol (75 ml.). At this point an excess of acetone was added to the ethyl alcohol salt solution with stirring and the salt crystallized out of solution as a white solid. The white solid was filtered off, washed with acetone and dried. Yield of product was 12 g. (73%), M.P. 258–259° C. dec.

Synthesis C was used to prepare:

4-phenyl-2,3-trimethylenethiazolium bromide

Thiopyrrolidone (1 mol., 10.1 g.) and α-bromoacetophenone (1 mol., 19.9 g.) were mixed in benzene (60 ml.) and heated on a steam bath for fifteen minutes. The light cream colored solid that formed was then filtered off, washed with acetone and dried. After recrystallization from ethyl alcohol the yield of salt was 27 g. (96%) M.P. 135–136° C.

The following syntheses were used to prepare other intermediates used in the preparation of our dyes.

3-anilinomethylene-2,3-dihydro-1H-pyrrolo[2,1-b]benzothiazolium bromide 2,3-trimethylenebenzothiazolium bromide (1 mol., 25.6 g.) and ethylisoformanilide (1 mol., 14.9 g.) were mixed in refluxing absolute ethyl alcohol (600 ml.) and the mixture heated under reflux for fifteen minutes. The reaction mixture was then chilled, yellow product filtered off, washed with acetone and dried. The yield of yellow solid was 30 g. (84%) M.P. 249°–250° C.

3-acetanilidomethylene-2,3-dihydro-1H-pyrrolo-[2,1-b]benzothiazolium bromide

3 - anilinomethylene - 2,3 - dihydro - 1H - pyrrolo-[2,1-b]benzothiazolium bromide (1 mol., 30 g.) was mixed in acetic anhydride (200 ml.) and the mixture heated under reflux for fifteen minutes, triethylamine (1 mol., 11.7 ml.) added and the entire mixture heated under reflux for ten minutes. At this point the mixture was chilled, acetylated product filtered off, washed with acetone and dried. The yield of rich yellow solid was 32 g. (99%) M.P. 281°–282° C.

4-acetanilidomethylene-5-phenyl-1,2,3,4-tetrahydro-pyrido[2,1-b]benzoxazolium bromide 5-phenyl-2,3-tetramethylenebenzoxazolium bromide (1 mol. 3.3 g.) and N,N′-diphenylformamidine (1 mol. plus 100% excess, 3.98 g.) were mixed in acetic anhydride (10 ml.) and the mixture heated to reflux, triethylamine (2 mols., 1.4 ml.) added and the entire mixture heated under reflux for one minute. At this point the mixture was chilled, thrown out of solution as a sticky mass by adding an excess of ether with stirring, ether decanted, fresh ether added, ether again decanted and the product obtained as a pink solid by adding acetone while stirring. The product was then filtered off, washed with acetone and dried. The yield of pink solid was 3.3 g. (70%) M.P. 232°–233° C.

Our dyes are useful in spectrally sensitizing photographic silver halide emulsions when incorporated therein. The dyes are especially useful for extending the spectral sensitivity of the customarily employed silver chloride, silver chlorobromide, silver bromide, silver bromoiodide and silver chlorobromoiodide developing out emulsions using a hydrophilic colloid carrier such as gelatin, its water-soluble derivatives, polyvinyl alcohol, its water-soluble derivatives and copolymers, water-soluble vinyl polymers, such as polyacrylamide, imidized polyacrylamide, etc., and other water-soluble film-forming materials that form water-permeable coatings, such as colloidal albumin, water-soluble cellulose derivatives like ethylanolamine cellulose acetate, etc. To prepare emulsions sensitized with one or more of our new dyes, it is only necessary to disperse the dye or dyes in the emulsions. The methods of incorporating dyes in emulsions are simple and well known to those skilled in the art. In practice, it is convenient to add the dyes to the emulsion in the form of a solution in a suitable solvent. Methanol, ethanol, propanol, etc., acetone and pyridine are used to advantage.

The dyes are advantageously incorporated in the finished, washed emulsions, and should be uniformly distributed throughout the emulsions.

The concentration of the dyes in the emulsions can vary widely, and will depend upon the type of emulsion and the effect desired. The suitable and most economical concentration for any given emulsion will be apparent to those skilled in the art, upon making the ordinary tests and observations customarily used in the art of emulsion making.

To prepare a hydrophilic colloid-silver halide emulsion sensitized with one or more of our new dyes, the following procedure is satisfactory. A quantity of dye is dissolved in a suitable solvent, such as an alcohol, acetone, pyridine, etc., and a volume of this solution, which may be diluted with water, containing the dye, is slowly added to about 1000 cc. of gelatino-silver halide emulsion, with stirring. Stirring is continued until the dye is uniformly dispersed in the emulsion.

The above statements are only illustrative, as it will be apparent that the dyes can be incorporated in photographic emulsions by any of the other methods customarily employed in the art, e.g. by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

Photographic silver halide emulsions, such as those listed above containing the sensitizing dyes of my invention can also contain such addenda as chemical sensitizers (e.g. sulfur sensitizers, such as allyl thiocarbamide, thiourea, allylisothiocyanate, cystine, etc.), various gold compounds, such as potassium chloroaurate, auric trichloride, etc. (see U.S. Patents 2,540,085, 2,597,856, and 2,597,915, for example), various palladium compounds (such as palladium chloride (U.S. 2,540,086), potassium chloropalladate (U.S. 2,598,079), etc.), etc., or mixtures of such sensitizers), antifoggants (e.g. benzotriazole, nitrobenzimidazole, 5-nitroindazole, etc. (see Mees, "The Theory of the Photographic Process," Macmillan Pub., p. 460), or mixtures thereof), hardeners (e.g. formaldehyde (U.S. 1,763,533), chrome alum (U.S. 1,763,533), glyoxal (Germany 538,713), dibromacrolein (British 406,750), etc.), color couplers (e.g., such as those described in U.S. Patent 2,423,730, Spence and Carroll U. S. application 771,380, filed Aug. 29, 1947, now U.S. Patent 2,640,776, issued June 2, 1953, etc.), or mixtures of such addenda. Dispersing agents for color couplers, such as substantially water-insoluble, high boiling crystalloidal materials, such as those set forth in U.S. Patents 2,322,027 and 2,303,940, can also be employed in the above-described emulsions.

The following example will serve to further illustrate how our dyes are used to sensitize photographic emulsions.

Example 1

A sensitizing amount of each of the dyes from the preceding examples was added to separate portions of a gelatino-silver halide emulsion. Each of these emulsions were coated on pieces of cellulose ester support and dried. Spectrographic exposures were made on each coating and these were processed in a photographic developer having the composition:

| | | |
|---|---|---|
| p-Methylaminophenol sulfate | grams | 2.0 |
| Sodium sulfite, desiccated | do | 90.0 |
| Hydroquinone | do | 8.0 |
| Sodium carbonate·$H_2O$ | do | 52.5 |
| Potassium bromide | do | 5.0 |
| Water to make | liter | 1 | fixed in a conventional sodium thiosulfate fixing bath, washed and dried. The following table summarizes the wavelength of light to which the maximum sensitivity was produced and the longest wavelength light to which each emulsion was sensitized.

| Dye Number | Silver Halide in Emulsion | Wavelength of Light in mμ to which— | |
|---|---|---|---|
| | | Dye Produces Maximum Sensitivity | Dye Sensitizes Emulsion |
| 1 | Silver bromoiodide | 620 | 650 |
| 2 | do | 570 | 630 |
| 3 | Silver chlorobromide | 480 | 590 |
| 4 | do | 540 | 570 |
| 5 | do | 550 | 600 |
| 6 | Silver bromoiodide | 615 | 645 |
| 7 | do | 575 | 620 |
| 8 | do | 550 | 600 |
| 9 | Silver chlorobromide | 510 | 560 |
| 10 | do | 530 | 580 |
| 11 | Silver bromoiodide | 650 | 680 |
| 12 | do | 555 | 590 |
| 13 | Silver chlorobromide | 530 | 550 |
| 14 | do | 620 | 510–630 |

The N,α-alkylene cyclammonium quaternary salts prepared according to our invention are valuable intermediates for the preparation of n,α-alkylene bridged sensitizing dyes which are valuable for use in photography. The valuable bridged dyes prepared by these reactions include dyes of the cyanine series, the merocyanine series, the styryl series, and the hemicyanine series.

The invention has been described in detail with particular reference to preferred embodiments thereof but it will be understood that variations and modifications can be effected within the spirit and scope of the invention as described hereinabove and as defined in the appended claims.

We claim:

1. A light-sensitive photographic silver halide emulsion comprising a hydrophilic colloid, silver halide grains and a sensitizing amount of a dye selected from the class consisting of those of the formulas:

I
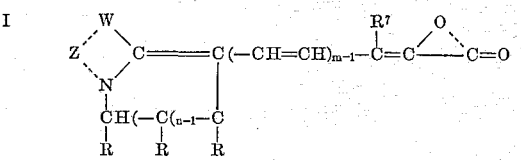

II
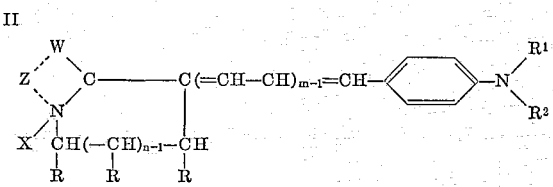

and

III
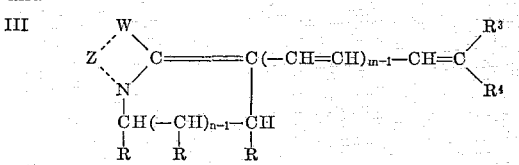

wherein W represents a member selected from the class consisting of the oxygen atom, the sulfur atom and the selenium atom; Z represents the non-metallic atoms necessary to complete a heterocyclic nucleus containing from 5 to 6 atoms in the heterocyclic ring; $n$ is an integer of from 1 to 2; $m$ is the integer of from 1 to 2; the R groups represent only one of the following: (a) identical groups selected from the class consisting of the hydrogenation, an alkyl group, and an aryl group, and (b) different groups selected from the class consisting of the hydrogen atom, an alkyl group, and an aryl group; Q represents the non-metallic atoms necessary to complete a heterocyclic nucleus containing from 5 to 6 atoms in the heterocyclic ring; R, $R^1$, and $R^2$ each represents a group selected from the class consisting of the hydrogen atom, an alkyl group and an aryl group; $R^3$ and $R^4$ each represents a group selected from the class consisting of the cyano group, a carbalkoxy group, a carboaryloxy group, a carboxy group and the acetamido group; and X represents an acid anion and $R^7$ represents a group selected from the class consisting of the hydrogen atom, an alkyl group and an aryl group.

2. A light-sensitive photographic silver halide emulsion comprising a hydrophilic colloid, silver halide grains and a sensitizing amount of a dye having the formula:

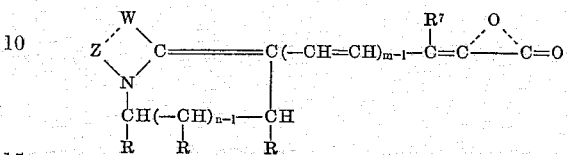

wherein W represents a member selected from the class consisting of the oxygen atom, the sulfur atom and the selenium atom; Z represents the nonmetallic atoms necessary to complete a heterocyclic nucleus containing from 5 to 6 atoms in the heterocyclic necleus; $n$ is an integer of from 1 to 2; $m$ represents an integer of from 1 to 2; the R groups represent only one of the following: (a) identical groups selected from the class consisting of the hydrogen atom, an alkyl group, and an aryl group, and (b) different radicals selected from the class consisting of the hydrogen atom, an alkyl group, and an aryl group; $R^7$ represents a group selected from the class consisting of the hydrogen atom, an alkyl group and an aryl group; Q represents the nonmetallic atoms necessary to complete a heterocyclic nucleus containing from 5 to 6 atoms in the heterocyclic nucleus.

3. A light-sensitive photographic silver halide emulsion comprising a hydrophilic colloid, silver halide grains and a sensitizing amount of a dye having the formula:

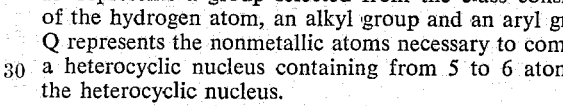

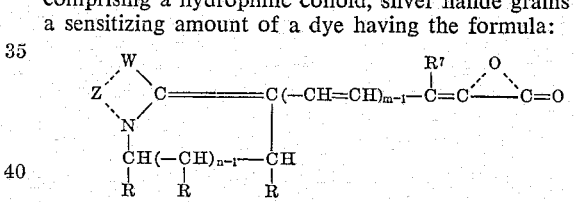

wherein W represents a member selected from the class consisting of the oxygen atom, the sulfur atom and the selenium atom; Z represents the nonmetallic atoms necessary to complete a heterocyclic nucleus containing from 5 to 6 atoms in the heterocyclic nucleus selected from the class consisting of a thiazole nucleus, a benzothiazole, nucleus, a naphthothiazole nucleus, a thionaphtheno-7′,6′,4,5-thiazole nucleus, an oxazole nucleus, a benzoxazole nucleus, a naphthoxazole nucleus, a selenazole nucleus, a benzoselenazole nucleus, and a naphthoselenazole nucleus; $n$ is an integer of from 1 to 2; $m$ represents an integer of from 1 to 2; the R groups represent only one of the following: (a) identical groups selected from the class consisting of the hydrogen atom, an alkyl group and an aryl group, and (b) different radicals selected from the class consisting of the hydrogen atom, an alkyl group and an aryl group; $R^7$ represents a group selected from the class consisting of the hydrogen atom, an alkyl group and an aryl group; and Q represents the nonmetallic atoms necessary to complete a heterocyclic nucleus containing from 5 to 6 atoms in the heterocyclic nucleus selected from the class consisting of a thiazolone nucleus, a 2-thio-2,4-thiazolidinedione nucleus, a 2-thio-2,5-thiazolidinedione nucleus, a 2-alkylmercapto-4(5)-thiazolone nucleus, a thiazolidone nucleus, a 2-alkylphenylamino-4(5)-thiazolone nucleus, a 2-diphenylamino-4(5)-thiazolone nucleus, a 5(4)-thiazolone nucleus, a 2-thio-2,4-oxazolidinedione nucleus, a pseudohydantoin nucleus, a 5(4)-oxazolone nucleus, a 5(4)-isoxazolone nucleus, a hydantoin nucleus, a 2-thiohydantoin nucleus, a 2-alkylmercapto-5(4)-imidazolone nucleus, a thionaphthenone nucleus, a pyrazolone nucleus, a oxindole nucleus and a 2,4,6-triketohexahydropyrimidine nucleus.

4. A light-sensitive photographic silver halide emulsion of claim 1 in which the sensitizing dye is 5-[3-(1,2-dihydropyrrolo[2,1 - b]benzothiazolyl)methylene] - 1 - ethyl-2-thiobarbituric acid.

5. A light-sensitive photographic silver halide emulsion of claim 1 in which the sensitizing dye is 3-ethyl-5-[4-(3-methyl - 1H - 2,3 - dihydropyrido[2,1 - b]benzothiazolyl)methylene]rhodanine.

6. A light-sensitive photographic silver halide emulsion of claim 1 in which the sensitizing dye is 3-ethyl-5-[(o-phenyl - 2,3 - dihydro - 1H - pyrido[2,1 - b]benzoxazol-4-yl)methyl]rhodanine.

7. A light-sensitive photographic silver halide emulsion of claim 1 in which the sensitizing dye is 4-p-dimethylaminobenzylidene - 3 - methyl - 1,2,3,4 - tetrahydropyrido[2,1-b]benzothiazolium iodide.

8. A light-sensitive photographic silver halide emulsion of claim 1 in which the sensitizing dye is 3-(4,4-dicyano-1,3-butadienyl)-1,2-dihydropyrrolo[2,1-b]benzothiazole.

9. A light-sensitive photographic silver halide emulsion of claim 1 in which the sensitizing dye is 5-[4-(1H-2,3-dihydropyrido[2,1 - b]benzothiazolyl)methylene] - 3-ethylrhodanine.

10. A light-sensitive photographic silver halide emulsion of claim 1 in which the sensitizing dye is 5-[3-(1,2-dihydropyrrolo[2,1 - b]benzothiazolyl)methylene] - 3-ethyl-2-thio-2,4-oxazololidinedione.

11. A light-sensitive photographic silver halide emulsion of claim 1 in which the emulsion is gelatino-silver bromoiodide.

12. A light-sensitive photographic silver halide emulsion of claim 1 in which the emulsion is gelatino-silver chlorobromide.

13. A photographic element containing at least one light-sensitive silver halide emulsion comprising a hydrophilic colloid, silver halide grains and a sensitizing amount of a dye having the formula:

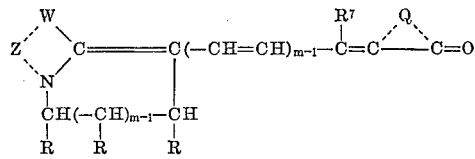

wherein W represents a member selected from the class consisting of the oxygen atom, the sulfur atom and the selenium atom; Z represents the nonmetallic atoms necessary to complete a heterocyclic nucleus containing from 5 to 6 atoms in the heterocyclic nucleus; $n$ is an integer of from 1 to 2; $m$ represents an integer of from 1 to 2; the R groups represent only one of the following: (a) identical groups selected from the class consisting of the hydrogen atom, an alkyl group and an aryl group, and (b) different radicals selected from the class consisting of the hydrogen atom, an alkyl group and an aryl group; $R^7$ represents a group selected from the class consisting of the hydrogen atom, an alkyl group and an aryl group; and Q represents the nonmetallic atoms necessary to complete a heterocyclic nucleus containing from 5 to 6 atoms in the heterocyclic nucleus.

References Cited
UNITED STATES PATENTS
2,954,376   9/1960   Nys et al. _____ 96—106
3,243,298   3/1966   Libeer et al. _____ 96—105

FOREIGN PATENTS
615,205   1/1949   Great Britain.

OTHER REFERENCES
Brooker et al., Journal of Photographic Science, vol. 1, pp. 173–183 (1953).

NORMAN G. TORCHIN, *Primary Examiner.*

J. TRAVIS BROWN, *Examiner.*

UNITED STATES PATENT OFFICE
CERTIFICATE OF CORRECTION

Patent No. 3,384,489                                    May 21, 1968

Lewis L. Lincoln et al.

It is certified that error appears in the above identified patent and that said Letters Patent are hereby corrected as shown below:

Column 15, lines 37 to 43, the formula should appear as shown below:

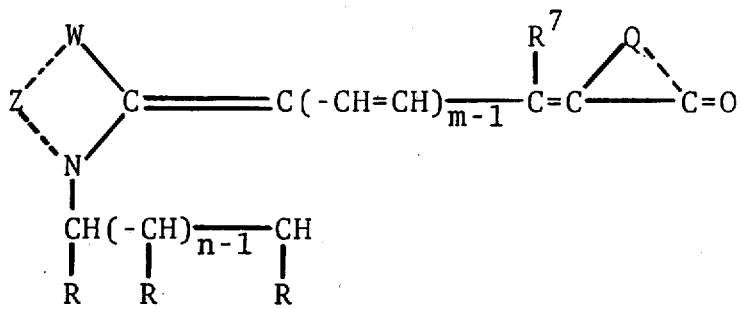

same column 15, lines 66 and 67, "hydrogenation" should read -- hydrogen atom --. Column 16, line 20, "necleus" should read -- nucleus --.

Signed and sealed this 5th day of May 1970.

(SEAL)
Attest:

EDWARD M. FLETCHER, JR.                WILLIAM E. SCHUYLER, JR.
Attesting Officer                       Commissioner of Patents

UNITED STATES PATENT OFFICE
CERTIFICATE OF CORRECTION

Patent No. 3,384,489　　　　　　Dated May 21, 1968

Inventor(s) Lewis L. Lincoln et al.

It is certified that error appears in the above-identified patent and that said Letters Patent are hereby corrected as shown below:

Column 16, lines 9-15 and 35-41, the right side of the structural formula should appear as shown below:

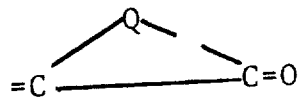

Signed and sealed this 11th day of May 1971.

(SEAL)
Attest:

EDWARD M. FLETCHER, JR.
Attesting Officer

WILLIAM E. SCHUYLER, JR.
Commissioner of Patents